Dec. 4, 1945.  J. J. BRADFORD  2,390,053
FILM MOUNT SLIDE
Filed March 23, 1943
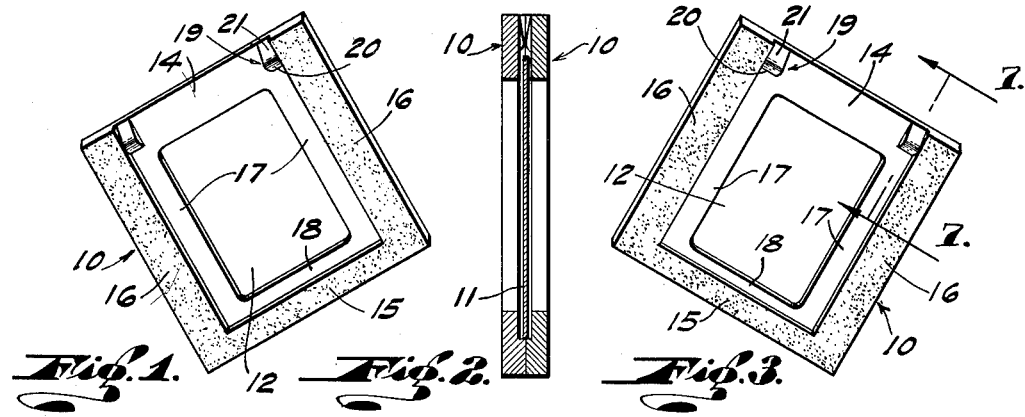
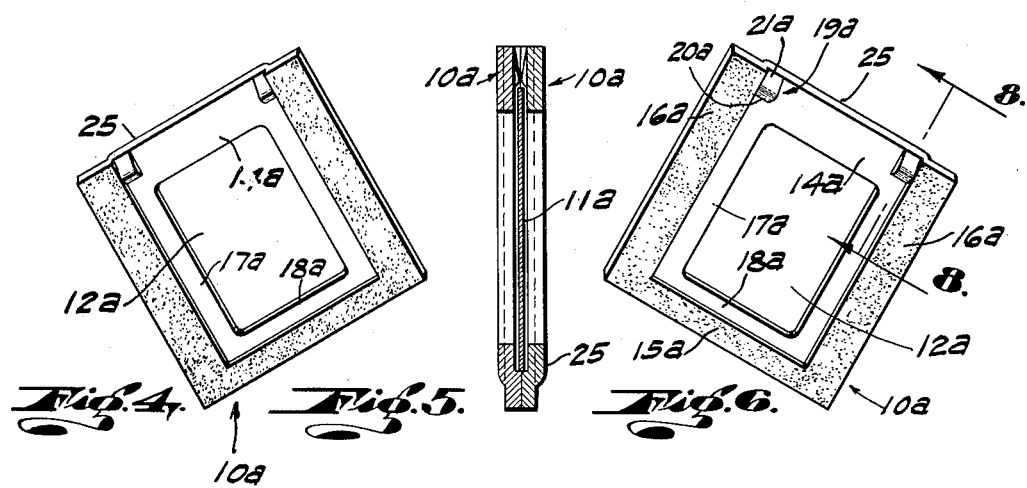
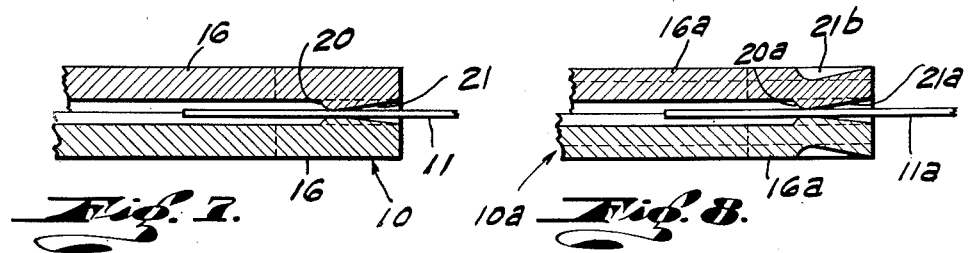
INVENTOR.
JAMES J. BRADFORD,
BY
ATTORNEY.

Patented Dec. 4, 1945

2,390,053

UNITED STATES PATENT OFFICE 2,390,053

FILM MOUNT SLIDE

James J. Bradford, Burbank, Calif.

Application March 23, 1943, Serial No. 480,180

6 Claims. (Cl. 88—26)

This invention relates to slides for projecting machines, such as magic lanterns, stereoscopes and the like, and for viewers which are devices designed to hold a slide and which incorporate a magnifying lens eyepiece through which the image is viewed instead of projecting it upon a screen.

More specifically speaking the invention pertains to an improved film mount or frame of sheet material for picture films.

The rectangular film mounts at present in general use are usually sealed or closed on all four sides, thus permanently enclosing the film in the mount. This is a serious drawback because both amateurs and other persons using picture films desire to be provided with a convenient and inexpensive means frequently to replace pictures that have been used for a considerable time with others which deal with new subjects without having to buy new frames. The foregoing drawback is overcome by the re-usable frame provided by the present invention.

It is a common practice, in slide mounts at present purchasable, to provide room for the thickness of the film by placing marginal strips of paper or other sheet material between the two plates forming the frame or mount which carries the film, such additional sheet material serving to hold the two frame plates apart sufficiently to permit the film to expand freely when heated. This construction adds to the manufacturing cost of the mount and results in an inferior article because the emulsion on the picture-carrying film is often scratched, thus injuring the image when the film passes over this filler during its insertion into the mount.

The film mounting means provided by this invention affords an unobstructed path for the film and overcomes danger of it being scratched while being inserted into or removed from the mount. Also the film is given ample room for expansion by heat, without any filler material being used to hold apart portions of the slide plates.

The aforesaid slide mounts now on the market are usually composed of four parts, namely, a front plate with the center cut out; a back member with the center cut out; a third plate used as a spacer between said front and back plates, said third plate having its center cut out to accommodate the film; and a fourth member consisting of a gelatine coated paper tongue used to prevent the fourth side from sticking until the film can be inserted.

The slide mount provided by this invention is composed of only two members, a front member with the center cut out and a back member with the center cut out, these two members being cemented together in a face-to-face manner during manufacture, thus providing a mount ready for immediate use.

The aforementioned and other defects and deficiencies of the prior art are overcome by the present invention, among other objects thereof being to lower the manufacturing cost of the frame portions of the picture-carrying slides; to produce a neater article and one that can be used in a more expeditious and satisfactory manner both by amateur and commercial operators; to provide for films a frame or mount into which the pictures may be inserted and from which they may be removed without destroying said frame, which is therefore re-usable; to provide, in conjunction with the latter feature, for the better protection of the picture film from being scratched or otherwise injured during insertion into and removal from its frame; and to produce a more satisfactory article for storage and stacking when not in use. The lowered manufacturing cost resulting from this invention encourages a more widespread use of picture slides for educational purposes.

Another of the important objects of this invention, in its preferred embodiment, is to improve over prior structures by using plate sinking, or thinning of plate portions by pressure applied by dies, rather than by methods heretofore used to provide space within the mount to accommodate the thickness of the film, thus providing the completed article with completely flat outside faces, permitting large numbers of the slides to be stacked upon each other without danger of the falling over of the stacks thus formed. Furthermore, the two flat outside surfaces make the slide suitable for use in any projector regardless of the style of holder.

Other objects, advantages and features of invention will hereinafter appear.

Referring to the accompanying drawing, which illustrates what are at present deemed to be preferred embodiments of the invention, Fig. 1 is an inside face view showing slightly in perspective the left hand frame plate of the twin plates shown in Fig. 2.

Fig. 2 is a longitudinal midsection of the plates of Figs. 1 and 3 adhered to each other in the relation required to form the complete frame, a picture-carrying film being sectionally shown in its inserted position within the frame.

Fig. 3 is an inside face view showing slightly in perspective the right hand frame plate of Fig. 2. Both of the plates shown in Figs. 1 to 3 are recessed by plate sinking and therefore both have flat outer faces.

Figs. 4, 5 and 6 are respectively views upon which will read the foregoing description of Figs. 1, 2 and 3, except that the depressed areas of the plates shown in these views are formed as the result of an embossing operation instead of by plate sinking.

Figs. 7 and 8 are enlarged fragmental sectional details taken respectively on line 7—7 of Fig. 3 and line 8—8 of Fig. 6. In said Figs. 7 and 8 a film fragment is shown in each view occupying the passage provided for its insertion and removal.

Referring in detail to the drawing, the slide mounting means provided by this invention for an individual picture film is composed of only two members, one of which is illustrated in Fig. 1 and the other of which is shown in Fig. 3, said members being twin plate sunk rectangular cards or plates 10. Owing to each of these plates having the same length and breadth as the other the two plates will register with each other when adhered together as shown in Fig. 2 thus forming a frame to support for display the picture on the film 11.

Each plate 10 has through it a rectangular opening 12, the edges of said openings alining in the assembly shown in Fig. 2 thus providing a film projection window through the frame.

The inner face of each plate 10 is rectangularly plate sunk on all sides of its aperture 12 to the same depth and throughout an area which extends all the way out to one end of the plate (the film admission and removal end), the depression thus formed providing, in the assembled frame a film admission and removal passage 14 and leaving an undepressed area which occupies three side portions of each plate, namely, an undepressed end area 15 and undepressed side areas 16, said areas 15 and 16 being coated with an adhesive substance whereby said plates are adhered to each other as shown in Fig. 2. At each side of the opening 12 the depressed area is designated 17, and the strip thereof bordering the end of the opening 12 farthest from the passage 14 is designated 18.

By plate sinking is meant operating with two dies upon a plate made of compressible material, one of the dies being a female die having a completely flat face, said flat face being opposed by a male die having a slightly elevated flat face portion surrounded by a flat face. The result of this operation is that a depressed area is formed where desired in the cardboard, or like compressible material, the plate being made thinner under this area but in its remaining portion continuing to be of the same thickness, and being flat throughout its outer face.

The dies whereby the plate sinking operation is performed upon the card or plate 10 are so shaped as to form, at the same operation, a pair of twin beveled lugs 19, each of said lugs having a steeply beveled inner end face 20 and a more inclined outer face 21. These lugs are located in the outer corner portions of the film admission passage 14 and therefore possess two advantages, namely, they are so positioned that they do not touch, and hence cannot mar, the image area of the film while the latter is being inserted and removed; and they are in the proper place to cause their more steeply inclined portions 20 to engage the outer end of the inserted film 11 thus effectively to oppose its accidental removal, while the less steeply inclined lug faces 21 facilitate insertion of the film.

Owing to the fact that, as can be seen in the assembled frame shown in Figs. 2 and 7, the two plates share equally in providing the proper thickness of space or pocket to receive and allow for the thermal expansion of the film 11, it is found to be feasible to plate sink thinner cardboard in the production of the frame, than would be possible if the depressed area were provided in only one of the plates.

In Figs. 2 and 5 the film retaining lugs of each cooperating pair are shown in substantially contacting relation to each other, but are crowded slightly apart during the insertion of the film, it being understood that the material of which the plates 10 or 10a are composed is of a sufficiently resilient or compressible character readily to yield sufficiently to permit the film being passed between said paired legs.

In Figs. 4, 5, 6 and 8 the modified structure shown is the same as that already described except that the pocket for the film is formed by the embossing method, thus imparting to each plate 10 a raised back portion 25 which underlies the depressed areas 14a, 17a and 18a and also contains a depression 21b behind each lug 19a. The other features of the modification are lettered the same as those of the corresponding parts of the form first described, except for the addition of the exponent a.

In this form of the invention the undepressed areas of the plates are also coated with adhesive which effectively secures them to each other. Also in both embodiments the keeper lugs (19 or 19a) at no time engage the portion of the film which carries or is opposite to the image, hence cannot mar the film in such a manner as to detract from the picture produced therefrom. Also, in both embodiments, said lugs cause only opposite edge portions of the film to engage the frame while the film is being inserted and removed, hence neither face of the image area of the film rubs against any part of the frame while the film is being inserted and removed. This last mentioned advantage results from providing four lugs positioned as already stated and consisting of two pairs, the lugs of each pair projecting only part way across the space of the passage which they occupy, so that a clearance is produced opposite each face of the partly inserted film, as shown in Figs. 7 and 8.

It should be understood that the present disclosure is for the purpose of illustration only and that this invention includes all modifications and equivalents which fall within the scope of the subject matter claimed.

What is claimed is:

1. A film holding frame comprising two duplicate plates of plate sinkable material adhered to each other in a face-to-face manner, each of said plates having through it an opening which corresponds in size and shape to and alines with the corresponding opening in the other plate in the assembled frame, each of said plates having along opposite sides and along one end of said opening a thinned area extending over a part only of the space between the opening and the outer edge of the plate, and also having at the opposite end of said opening a thinned area which extends all the way out to that end of the plate so that when the plates are adhered to each other as aforesaid the latter thinned area of each plate cooperates with that of the other plate to form a film ingress and exit passage and the remaining thinned areas of the plates cooperate to form a space to contain the film.

2. A film holding frame consisting of two matched cards adhered to each other in a face-to-face manner and having between them a clearance to provide for removably containing a film, said clearance including a passageway for inserting and removing the film, at least one of said cards having formed as an integral part thereof a lug which obstructs the accidental displacement of the inserted film at its corner portions only.

3. A film holding frame comprising two duplicate cards adhered to each other in a face-to-face manner, each of said cards having through it an aperture which registers with that of the other card when the cards are in the aforesaid adhered relation, thereby providing a window opening through the frame, each one of said cards comprising a material capable of being depressed throughout a portion of their area, such cards having depressed portions thereby providing a film receiving depression bordering said aperture and a further depressed portion leading to the outer edge of each card providing a film inserting and removing space and in that face of each card which is directed toward the other card.

4. A film holding frame for projection purposes comprising two duplicate plates of plate sinkable material adhered to each other in a face-to-face manner, each of said plates having through it an opening which corresponds in size and shape to and alines with the corresponding opening in the other plate in the assembled frame, each of said plates having along opposite sides and along one end of said opening a thinned area extending over a part only of the space between the opening and the outer edge of the plate, and also having at the opposite end of said opening a thinner area which extends all the way out to that end of the plate so that when the plates are adhered to each other as aforesaid the latter thinned area of each plate cooperates with that of the other plate to form a film ingress and exit passage and the remaining thinned areas of the plates cooperate to form a space to contain the film, each of said two plates having an integrally formed film retaining lug which projects into the outer corner portions of one side of said film ingress and exit passage and cooperates with a corresponding lug of the other plate to retain the film in place.

5. A picture film frame having through it a projection opening and having within it a pocket to contain the film in a position to display an image thereon through said opening, said frame having a passage leading into said pocket from one of the edges of the frame through which the film is insertable and removable, and lugs integrally formed with said frame and projecting upwardly into said passage to yieldingly oppose the withdrawal of the film from said pocket, said lugs being in two pairs one of which is located adjacent to each of opposite sides of said passage, the lugs of each pair being positioned to engage opposite faces of the film only at points outside the image area as the film passes between them.

6. A film holding frame comprising two cards adhered to each other in a face-to-face manner, each of said cards having through it an aperture which registers with that of the other card when the cards are in the aforesaid adhered relation, thereby providing a window opening through the frame, at least one of said cards comprising a material capable of being plate sunk throughout a portion of its area, the latter card having a thinned portion thereby providing a film receiving depression bordering said aperture and a further thinned portion leading to the outer edge of said card providing a film inserting and removing space, at least one of said cards having a lug extending into a corner portion of said passage to oppose the outward movement of the film through said passage.

JAMES J. BRADFORD.